United States Patent [19]
Mansfield

[11] Patent Number: 6,054,866
[45] Date of Patent: *Apr. 25, 2000

[54] METHOD AND APPARATUS FOR MEASURING DISTANCE USING CAPACITANCE CHARACTERISTIC

[75] Inventor: Lee Mansfield, Derby, United Kingdom

[73] Assignee: Rolls-Royce plc, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,729

[22] Filed: Sep. 23, 1997

[30] Foreign Application Priority Data

Sep. 26, 1996 [GB] United Kingdom .................... 9620053

[51] Int. Cl.$^7$ ...................................................... G01B 7/14
[52] U.S. Cl. ........................... 324/635; 324/662; 324/690; 324/682
[58] Field of Search ..................................... 324/662, 690, 324/671, 635

[56] References Cited

U.S. PATENT DOCUMENTS

| | | | |
|---|---|---|---|
| 4,384,819 | 5/1983 | Baker | 324/635 |
| 4,806,848 | 2/1989 | Demers | 324/662 |
| 5,101,165 | 3/1992 | Rickards | 324/662 |
| 5,119,036 | 6/1992 | Rickards | 324/662 |
| 5,166,626 | 11/1992 | Hester | 324/690 |
| 5,175,520 | 12/1992 | Inoue . | |
| 5,359,491 | 10/1994 | Coville | 361/280 |
| 5,892,365 | 4/1999 | Bailleul | 324/662 |

FOREIGN PATENT DOCUMENTS

| | | | |
|---|---|---|---|
| 2142372 | 3/1973 | Germany | 324/635 |
| 4040084 | 6/1992 | Germany . | |
| 61-038574 | 8/1987 | Japan . | |
| 1498407 | 1/1978 | United Kingdom . | |
| 2071852A | 9/1981 | United Kingdom . | |
| 2164448 | 3/1986 | United Kingdom . | |

*Primary Examiner*—Josie Ballato
*Assistant Examiner*—Jose M. Solis
*Attorney, Agent, or Firm*—W. Warren Taltavull; Farkas & Manelli PLLC

[57] ABSTRACT

Method and apparatus for measuring distance includes a capacitance probe positioned adjacent a rotating member and within the housing of the rotating member such that the distance between the probe and rotating member can be measured. The rotating member and probe co-operate with each other so as to define a capacitor. An oscillator comprising a transmission line is electrically connected to the probe, the resonat frequency value of which is a function of the capacitance of the capacitor. The change in distance between the rotating member and the probe can therefore be measured.

7 Claims, 1 Drawing Sheet

METHOD AND APPARATUS FOR MEASURING DISTANCE USING CAPACITANCE CHARACTERISTIC

THE FIELD OF THE INVENTION

This invention relates to a method and apparatus for distance measurement. More particularly but not exclusively this invention relates to the measurement of distance between the measurement apparatus and a rotating member.

BACKGROUND OF THE INVENTION

The efficiency of, for example, a gas turbine engine is dependent upon, inter alia, the clearance between the tips of its blades and the casing and in particular compressor and turbine blades and their surrounding casing. Thus the smaller the clearances, the lower is the gas leakage across the aerofoil tips. However under certain engine conditions the aerofoil blades and their associated discs may experience thermal growth and there is an increased risk of contact with the casing.

It is an essential part of a gas turbine engine's development to accurately measure the clearance between the tips of blades and the associated casing. Prior art systems for providing such measurement include the use of a probe mounted on the casing surrounding the blades. The blade tip and probe act in effect as the two plates of a capacitor. The probe relies on a capacitance change within the clearance between the blade and casing/probe. More specifically the capacitors defined by the aerofoil blade tips and the probe are used as the frequency determining element in the tuned circuit of a high frequency oscillator. As the blade tip clearances alter so do the capacitances of the formed capacitors and hence the frequency of the oscillator. The oscillator output is then used to provide a measurement of the clearance between the blade tips and casing.

One prior art system for measuring blade tip clearances is disclosed in GB 2071852A and reference is directed thereto. An oscillator is provided remote from the blade tip and is connected to a conductor which forms part of a probe positioned close to a blade tip. The output frequency of the oscillator is a function of each of the capacitors defined by the probe, the blade tips and the inductance of an inductor which constitutes part of the oscillator.

During certain operating conditions the probe may be subject to temperature changes. Such temperature changes result in corresponding changes in the dielectric constant of the insulating material of the conductor and the capacitance correspondingly changes. It has previously been proposed to provide a guard electrode within the probe and connected to the oscillator. The guard electrode serves to ensure that any changes in the dielectric constant of the insulating material have no effect on the frequency of the oscillator.

Even relatively small changes in temperature may cause errors in the system which are many times greater than the distance related capacitance. However the length of the cable used with a guard electrode is limited because of difficulty in driving the large guard capacitance at high frequencies.

Thus if the capacitance increases to such an extent then it is not possible to use the probe further. It is therefore necessary to position the oscillator circuit close to the probe which is undesirable in high operating temperatures.

SUMMARY OF THE INVENTION

It is an aim of this invention to provide a method and apparatus which alleviates the aforementioned disadvantages and which allows use of a longer cable and provides improvements generally.

According to the present invention there is provided apparatus for measuring distance comprising probe means adapted to be positioned adjacent a rotating member and within the housing of said rotating member so that in operation said rotating member co-operates with said probe means to define a capacitor, and oscillator means comprising conductor means electrically interconnected with said probe means wherein said conductor means is adapted to provide a resonant frequency value to said oscillator means said frequency value being a function of the capacitance of said capacitor and hence the distance between said rotating member.

Also according to the present invention there is provided a method of measuring distance between a rotating member and measurement probe means the method comprising the steps of measuring the capacitance between said rotating member and said measurement probe, measuring any change in capacitance between said rotating member and said probe, converting said change in capacitance to a resonant frequency value within oscillator means the oscillator means comprising at least one transmission line electrically connected to said probe and said oscillator means providing a frequency value dependent upon the change in distance between said rotating member and said probe means.

Preferably the rotating member comprises a gas turbine engine aerofoil blade. The distance between each tip of a blade and the base of the probe may be measured by monitoring the change in capacitance within the clearance.

DETAILED DESCRIPTION OF THE INVENTION

Figure 1:
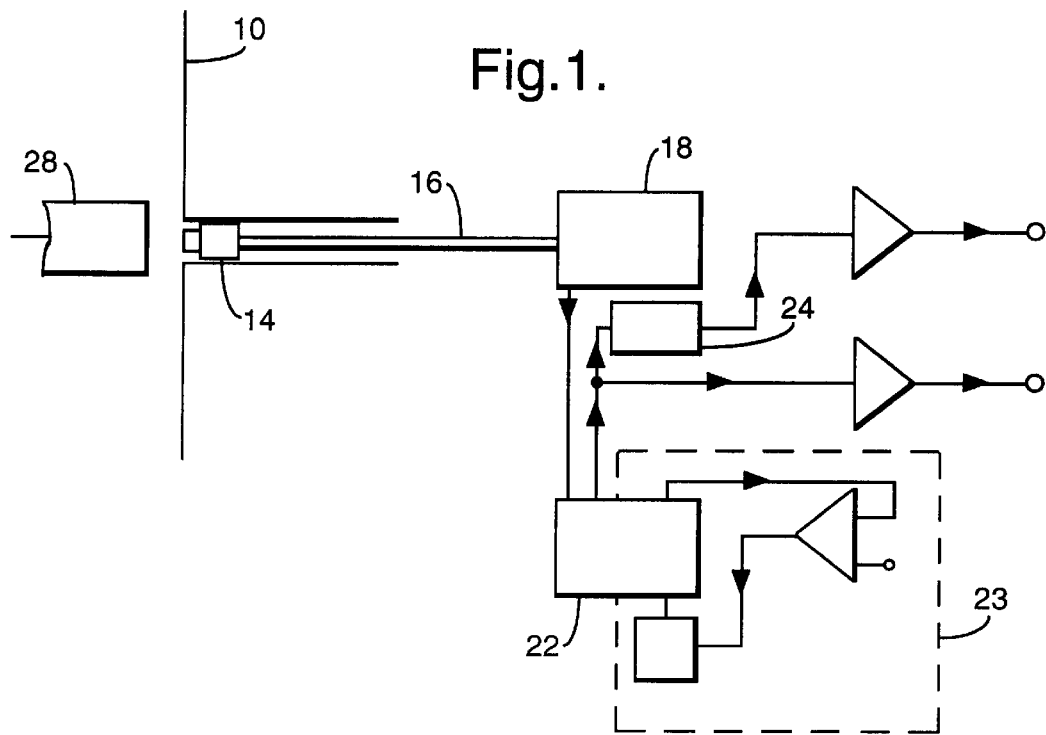
FIG. 1 is a diagrammatic representation of a distance measurement apparatus in accordance with the present invention.

With reference to FIG. 1 the compressor of a gas turbine engine is provided with a casing 10 which encloses an aerofoil array of turbine blades. One of the blades is indicated at 28.

Figure 2:
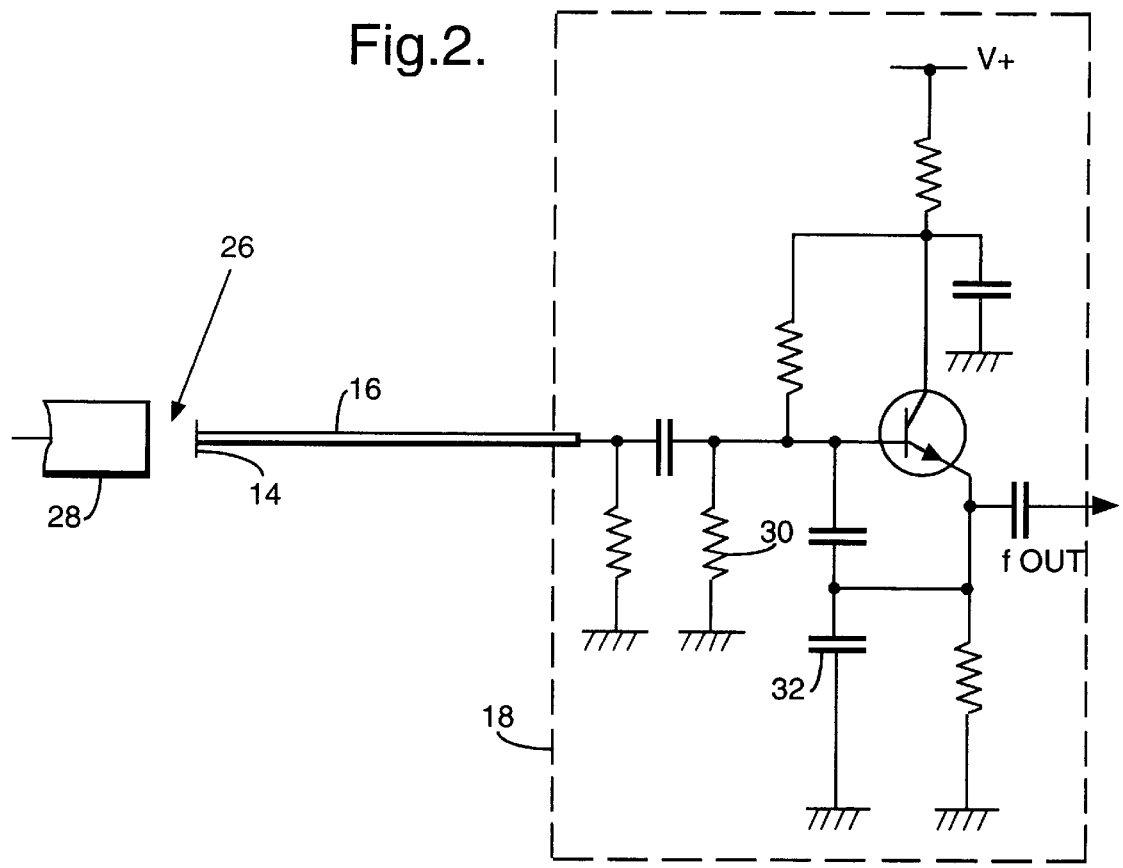
FIG. 2 is an example of an oscillator circuit in accordance with the present invention.

The casing 10 is provided with a probe 14 which is fixed thereto. The probe is shown diagrammatically in FIG. 1 but it's actual configuration is shown in FIG. 2.

The probe 14 is connected to a coaxial cable transmission line 16 which in turn is connected to a transmission line oscillator 18. The transmission line 16 comprises a coaxial cable which has a known capacitance value (C) for a known length of cable and is arranged to comprise a length of half a wavelength at the desired operating frequency of the system. More particularly the transmission line has a characteristic impedance (Z) ie. that a wave moving along the line has a ratio of voltage to current equal to Z. Any change in capacitance affects the resonant frequency (f) of the cable by capacitance end loading where $f = v/\lambda$; where v is the velocity of the wave within the cable dielectric. For example if the desired length of line is 7 meters then the oscillator frequency will be about 14 MHz depending on the dielectric constant of transmission line 16. A half wavelength of cable is used as compared the prior art systems of a lumped constant oscillator circuit utilizing L and C where $f = \frac{1}{2}\Pi\sqrt{LC}$ at resonance.

The transmission line 16 behaves in a similar way to a parallel combination of inductance and capacitance. When a capacitor is combined with an inductor it is possible to construct a circuit with sharp frequency characteristics, for example a large peak in the response at a particular frequency. Because of the opposite behaviours of inductors and capacitors the impedance of the parallel LC goes up sharply at the resonant frequency $f=\frac{1}{2}\Pi\sqrt{LC}$ which provides peak in the response at this point. However the present invention uses the properties of a resonant length of transmission line 16 as the frequency determining value rather than a lumped constant coil and capacitor arrangement although the same principles explained above are employed.

Probe 14 is coupled to oscillator 18 via coaxial transmission line 16. The resonant frequency of line 16 forms an essential element of oscillator 18 and varies with capacitance changes at probe 14. This variation in frequency is then demodulated using a low noise demodulator 22. The signal is then fed into a self tuning loop 23. The signal from demodulator 22 is then fed into an RMS-DC converter 24 changing its RMS value into a DC value. The resultant signal is then filtered and amplified for subsequent recording.

With regard to FIG. 2, a rotating gas turbine or compressor blade 28 is positioned adjacent probe 14 connected to transmission line 16. Transmission line 16 comprising a coaxial cable reacts to the change in capacitance by providing a resonant frequency value which forms the frequency determining element of oscillator 18. Oscillator 18 houses a circuit comprising a suitable arrangement of resistors 30 and capacitors 32 and transistors.

The capacitance of probe 14 is proportional to the dielectric constant K of the gap between the end of the electrode and the blade tip and the gap itself. It is clear therefore that a change in capacitance will allow a corresponding change in distance to be calculated. Unlike prior art systems it is the transmission line cable which acts as a resonator itself. Prior art systems use a coil and capacitor arrangement connected via a triaxial cable to the sensor. Advantageously a longer length of cable may be used since a guard electrode is not required.

I claim:

1. Apparatus for measuring distance comprising probe means adapted to be positioned adjacent a rotating member and within the housing of a rotating member so that in operation said rotating member co-operates with said probe means to define a capacitor, and oscillator means comprising conductor means interconnecting said probe means with said oscillator, wherein said conductor means is adapted to provide a resonant frequency value of said oscillator, said frequency value being varied by the capacitance of said capacitor and hence the distance between said rotating member and said probe means.

2. Apparatus for measuring distance as claimed in claim 1 wherein said rotating member comprises a gas turbine engine aerofoil blade.

3. Apparatus for measuring distance as claimed in claim 1 or claim 2 wherein said conductor comprises a coaxial cable.

4. A method of measuring distance between a rotating member and measurement probe means comprising the steps of
   a) establishing a capacitor between said rotating member and said measurement probe, such that the capacitance of said capacitor is representative of the distance between the rotating member and said measurement probe,
   b) establishing a resonant frequency circuit including the probe means, a transmission line connected between said probe means and an oscillator and
   c) selecting the resonant frequency value of said transmission line so that a change in the distance between the rotating member and the probe means will result in a change in the resonant frequency due to a change in the capacitance across the distance between the rotating member and said probe means.

5. Apparatus as claimed in claim 1 wherein the resonant frequency has an associated wavelength and the length of the conductor means is substantially a multiple of half of said wavelength.

6. Apparatus as claimed in claim 1 wherein said conductor means comprises a transmission line.

7. A method of measuring distance between a rotating member and measurement probe means comprising the steps of
   a) establishing a capacitor between said rotating member and said measurement probe, such that the capacitance of said capacitor is representative of the distance between the rotating member, and said measurement probe,
   b) measuring any change in capacitance between said rotating member and said probe,
   c) converting said change in capacitance to a resonant frequency value within oscillator means comprising at least one transmission line connected to said probe, said oscillator means providing a frequency value dependent upon the change in distance between said rotating member and said probe means.

* * * * *